(12) United States Patent
Foley (10) Patent No.: US 7,860,791 B2
(45) Date of Patent: Dec. 28, 2010

(54) FINANCIAL INSTRUMENT UTILIZING A CUSTOMER SPECIFIC DATE

(75) Inventor: Mark J. Foley, Simsbury, CT (US)

(73) Assignee: The Prudential Insurance Company of America, Newark NJ ( * ) Notice: Subject to any disclaimer, the term of this patent is extended or adjusted under 35 U.S.C. 154(b) by 572 days.

(21) Appl. No.: 11/531,948

(22) Filed: Sep. 14, 2006

(65) Prior Publication Data

US 2008/0071679 A1 Mar. 20, 2008

(51) Int. Cl.
G06Q 40/00 (2006.01)
(52) U.S. Cl. .......................................................... 705/40
(58) Field of Classification Search .................... 705/40
See application file for complete search history.

(56) References Cited

U.S. PATENT DOCUMENTS

| | | |
|---|---|---|
| 4,742,457 A | 5/1988 | Leon et al. |
| 5,126,936 A | 6/1992 | Champion et al. |
| 5,148,365 A | 9/1992 | Dembo |
| 5,185,696 A | 2/1993 | Yoshino et al. |
| 5,214,579 A | 5/1993 | Wolfberg et al. |
| 5,291,398 A | 3/1994 | Hagan .......................... 364/408 |
| 5,631,828 A | 5/1997 | Hagan |
| 5,754,980 A | 5/1998 | Anderson et al. ............. 705/14 |
| 5,812,987 A | 9/1998 | Luskin et al. |
| 5,893,071 A | 4/1999 | Cooperstein .................... 705/4 |
| 5,933,815 A | 8/1999 | Golden ......................... 705/35 |
| 6,064,969 A | 5/2000 | Haskins .......................... 705/4 |
| 6,064,986 A | 5/2000 | Edelman ....................... 705/36 |
| 6,208,978 B1 * | 3/2001 | Walker et al. .................. 705/38 |
| 6,213,390 B1 | 4/2001 | Oneda |
| 6,219,650 B1 | 4/2001 | Friend et al. |
| 6,253,192 B1 | 6/2001 | Corlett et al. .................. 706/36 |
| 6,275,807 B1 | 8/2001 | Schirripa ........................ 705/4 |

(Continued)

FOREIGN PATENT DOCUMENTS

WO    WO 92/22036    12/1992

OTHER PUBLICATIONS

Q3 2003 Primedia Earnings Conference Cal-Part, Fair Disclosure Wire.*

(Continued)

Primary Examiner—Hani Kazimi
Assistant Examiner—Hatem Ali
(74) Attorney, Agent, or Firm—Baker Botts L.L.P.

(57) ABSTRACT

According to one embodiment of the invention, a financial instrument issued to a customer includes an account and a guarantee of a protected value. The account has an account balance that changes over time, wherein at least part of the account balance is based on an initial deposit into the account. The protected value is fixed at the time of a particular event at a value at least equal to the greatest of the initial deposit, the account balance at the time of the particular event, and the highest value of the account balance on at least one anniversary of a customer specific date between the date of the initial deposit and the time of the particular event. The customer specific date is specific to the customer, determined no later than the time the financial instrument is issued, and independent of any transaction specific date related to the financial instrument.

46 Claims, 6 Drawing Sheets

U.S. PATENT DOCUMENTS

| | | |
|---|---|---|
| 6,278,983 B1 | 8/2001 | Ball |
| 6,343,272 B1 | 1/2002 | Payne et al. .................... 705/4 |
| 6,360,210 B1* | 3/2002 | Wallman .................. 705/36 R |
| 6,415,267 B1 | 7/2002 | Hagan ......................... 705/35 |
| 6,592,030 B1 | 7/2003 | Hardesty .................... 235/380 |
| 6,611,808 B1 | 8/2003 | Preti et al. ..................... 705/4 |
| 6,611,815 B1 | 8/2003 | Lewis et al. .................. 705/35 |
| 6,615,180 B1 | 9/2003 | Anderton et al. ............... 705/4 |
| 6,615,188 B1 | 9/2003 | Breen et al. |
| 6,636,834 B1 | 10/2003 | Schirripa ....................... 705/4 |
| 7,089,201 B1 | 8/2006 | Dellinger et al. ............. 705/35 |
| 7,249,077 B2* | 7/2007 | Williams et al. ............. 705/35 |
| 7,308,429 B1 | 12/2007 | Tozzi |
| 7,398,241 B2 | 7/2008 | Fay et al. |
| 7,457,776 B1 | 11/2008 | Caruso et al. |
| 2001/0014873 A1 | 8/2001 | Henderson et al. ............ 705/35 |
| 2002/0156710 A1 | 10/2002 | Ryder ......................... 705/35 |
| 2002/0174042 A1 | 11/2002 | Arena et al. |
| 2002/0188540 A1 | 12/2002 | Fay et al. ...................... 705/36 |
| 2002/0194098 A1 | 12/2002 | Stiff et al. ..................... 705/36 |
| 2003/0004844 A1 | 1/2003 | Hueler ........................ 705/35 |
| 2003/0014285 A1 | 1/2003 | Richard ......................... 705/4 |
| 2003/0083972 A1 | 5/2003 | Williams ..................... 705/36 |
| 2003/0088430 A1 | 5/2003 | Ruark ........................... 705/1 |
| 2003/0105690 A1 | 6/2003 | Brown et al. .................. 705/35 |
| 2003/0120570 A1 | 6/2003 | Dellinger et al. ............. 705/35 |
| 2003/0154161 A1 | 8/2003 | Stahl et al. ................... 705/38 |
| 2003/0187764 A1 | 10/2003 | Abbs et al. ................... 705/35 |
| 2003/0233301 A1 | 12/2003 | Chen et al. ................... 705/36 |
| 2004/0078244 A1 | 4/2004 | Katcher ........................ 705/4 |
| 2004/0088236 A1 | 5/2004 | Manning ..................... 705/35 |
| 2004/0148202 A1 | 7/2004 | Siefe et al. ..................... 705/4 |
| 2004/0158517 A1 | 8/2004 | Mahaney et al. |
| 2004/0172350 A1 | 9/2004 | Atkinson et al. ............. 705/35 |
| 2004/0177022 A1 | 9/2004 | Williams et al. ............. 705/36 |
| 2004/0199418 A1 | 10/2004 | Hertz |
| 2004/0215493 A1 | 10/2004 | Koppes et al. |
| 2004/0225536 A1 | 11/2004 | Schoen et al. |
| 2004/0230610 A1 | 11/2004 | Gutierrez-Sheris |
| 2005/0021363 A1 | 1/2005 | Stimson et al. |
| 2005/0060251 A1 | 3/2005 | Schwartz et al. ............. 705/35 |
| 2005/0065809 A1 | 3/2005 | Henze ........................... 705/1 |
| 2005/0086085 A1 | 4/2005 | Berlin et al. ................... 705/4 |
| 2005/0086144 A1 | 4/2005 | Lang |
| 2005/0144124 A1 | 6/2005 | Stiff et al. ..................... 705/39 |
| 2005/0187840 A1 | 8/2005 | Stiff et al. |
| 2005/0234747 A1 | 10/2005 | Kavanaugh .................... 705/4 |
| 2005/0234821 A1* | 10/2005 | Benham et al. ............... 705/40 |
| 2005/0256748 A1 | 11/2005 | Gore et al. ..................... 705/4 |
| 2005/0278200 A1 | 12/2005 | Brawley et al. ................ 705/4 |
| 2006/0015429 A1 | 1/2006 | Sullivan et al. |
| 2006/0041453 A1 | 2/2006 | Clark et al. |
| 2006/0111997 A1 | 5/2006 | Abbott et al. |
| 2006/0122874 A1 | 6/2006 | Postrel |
| 2006/0178966 A1 | 8/2006 | Jung et al. |
| 2006/0259390 A1 | 11/2006 | Rosenberger et al. |
| 2007/0011063 A1 | 1/2007 | Shelon |
| 2007/0011086 A1 | 1/2007 | Dellinger et al. ............. 705/38 |
| 2007/0050217 A1 | 3/2007 | Holden, Jr. |
| 2007/0100715 A1 | 5/2007 | O'Donnell et al. |
| 2007/0100727 A1* | 5/2007 | Multer et al. ............. 705/36 R |
| 2007/0198377 A1 | 8/2007 | Livingston et al. |
| 2007/0255635 A1 | 11/2007 | Multer et al. |
| 2008/0071655 A1 | 3/2008 | Carlson et al. |
| 2008/0071679 A1 | 3/2008 | Foley |
| 2008/0082369 A1 | 4/2008 | Carlson et al. |
| 2008/0114703 A1 | 5/2008 | Dahlberg et al. |
| 2008/0168007 A1 | 7/2008 | Clark et al. |
| 2008/0189218 A1 | 8/2008 | Herschler et al. |
| 2008/0189219 A1 | 8/2008 | Herschler et al. |
| 2008/0189220 A1 | 8/2008 | Herschler et al. |

OTHER PUBLICATIONS

Can Online Investors outperform the NASDAQ-100?*

The Implication of . . . Economic policy.*

State Farm Insurance, Like a good neighbor, State Farm is there, Future Income Plus, 3 pages.

Journal of Financial Planning, Article 6, A Stages Model for Planning Retirement Income Distribution, Michael D. Everett, et al., 10 pages, Jun. 2003.

Transamerica Life Insurance Company; Transamerica Announces New Liberty Flexible Premium Variable Annuity with 5 for Life Rider; 2005 Transamerica Capital, Inc.; 1 page, Jan. 24, 2005.

Jackson National Life Insurance Company; Variable Annuities; Perspective II; Features and Benefit Options Guide; VADV10871; pp. 1 to 25, Nov. 2004.

USAllianz High Five Variable Annuity Prospectus; A Flexible Payment Variable Annuity: Allianz Life Variable Account B; Allianz Life. The best at next, pp. 1 to 80, Apr. 29, 2005.

Il Annuity & Insurance Co Separate Account 1; 485BPOS IL Annuity and Insurance Form N-4 Post-Effective; File No. 033-089028; GSI; LIVEDGAR Information Provided by Global Securities Information, Inc., pp. 1 to 99, Apr. 26, 1996.

Manufacturers Life Insurance Co USA Separate Account H; 485APOS; The Manufacturers Life Insurance Company; GSI; LIVEDGAR Information provided by Global Securities Information, Inc., pp. 1 to 161, Mar. 1, 1999.

Prospectus MetLife Investors Insurance Company; MetLife; Class Variable Annuities VA; May 1, 2005.

I4Life ADVANTAGE, "Lincoln ChoicePlus Variable Annuities with I4LIFE@Advantage and Optional Guaranteed Income Benefit," http://www.lfg.com/LincolnPageServer?LFGPage=/lfg/bdc/ prd/ann/i41/index.html&KPage_Action=PRIN..., 2 pages, Printed Jan. 25, 2005.

Manulife Financial, "Venture Combination Fixed and Variable Annuity," Financial Planning Resources, Inc., 4 pages, Jul. 1999.

Brochure, "Optional Retirement Program Overview," http://www6.ingretirementplans.com/ SponsorExtranet/UTexas/YourPlanHighlights/10UtexasORPovervie..., ING North America Insurance Corporation, 3 pages, © 2002-2004 Printed Jan. 25, 2005.

Brochure, "403(b) Tax Deferred Annuity (TDA) Overview," http://www6.ingretirementplans.com/ SponsorExtranet/UTexas/YourPlanHighlights/20UTexasTDA.html, ING North America Insurance Corporation, 3 pages, © 2002-2004 Printed Jan. 25, 2005.

Brochure, "ORP and TDA Payout Options," http://www6.ingretirementplans.com/SponsorExtranet/ UTexas/YourPlanHighlights/30Utexas Payout.html, ING North America Insurance Corporation, 1 page, © 2002-2004 Printed Jan. 25, 2005.

Brochure, "TDA Fund Options," http://www6.ingretirementplans.com/SponsorExtranet/UTexas/ AboutYourInvestments/20UTexasTDAfun..., ING North America Insurance Corporation, 4 pages, © 2002-2004 Printed Jan. 25, 2005.

White Paper, "Manulife Offers Payout Floor on Variables," Best's Review—Life-Health Insurance Edition, BestWire, 1 page, Jul. 20, 1998.

GSI, "Variable Annuity Account B of ING Life Ins & Annuity Co," 485BPOS, Aetna Life Insurance and Annuity Company Form N-4, www.gsionline.com, LIVEDGAR® Information Provided by Global Securities Information, Inc., 25 pages, As filed w/Sec on Nov. 24, 1999.

Brochure, "Guaranteed Minimum Withdrawal, Accumulation and Death Benefit Rider (GMWB/AB/DB)," Penn Mutual, T2090, 2 pages, Sep. 2005.

Supplement Prospectus, "Enhanced Credit Variable Annuity, Pennant Select and Penn Freedom" includes Supplement dated Oct. 25 and Aug. 22, 2005 to Prospectus dated May 1, 2005 Penn Mutual Life Insurance Company, 50 pages, Oct. 25, 2005 Aug. 25, 2005.

Robert F. O'Donnell, et al., "Financial Instrument Providing a Guaranteed Growth Rate and a Guarantee of Lifetime Payments," U.S. Appl. No. 11/404,979, pending, 58 pages, filed Apr. 14, 2006.

Peter C. Carlson, et al., "Financial Instrument Providing a Portable Guarantee," U.S. Appl. No. 11/531,872, pending, 60 pages, filed Sep. 14, 2006.

Peter C. Carlson, et al., "Financial Instrument Utilizing an Optional Benefit Election," U.S. Appl. No. 11/531,977, pending, 54 pages, filed Sep. 14, 2006.

Jacob M. Herschler et. al., "System and Method for Providing a Financial Instrument with an Asset Transfer Feature," U.S. Appl. No. 11/671,598, filed Feb. 6, 2007.

Jacob M. Herschler et. al., "System and Method for Providing a Financial Instrument Utilizing a Liability Ratio," U.S. Appl. No. 11/671,625, filed Feb. 6, 2007.

Jacob M. Herschler et. al., "System and Method for Providing a Financial Instrument with a Periodic Step-Up Feature," U.S. Appl. No. 11/671,679, filed Feb. 6, 2007.

Brennan et al., "Time-Invariant Portfolio Insurance Strategies," The Journal of Finance, vol. 43, No. 2, 18 pages, Printed Mar. 15, 2007.

TSP Annuities, Jul. 2004, Federal Retirement Thrift Investment Board, 43 pages, Jul. 2004.

TSP Feature Chapter 1, www.archive.org, U.S. Appl. No. 11/531,872, 6 pages, May 2, 2001.

TSP Feature Chapter 2, www.archive.org, U.S. Appl. No. 11/531,872, 7 pages, May 5, 2001.

TSP Feature Chapter 13, www.archive.org, U.S. Appl. No. 11/531,872, 6 pages, May 5, 2001.

O'Donnell et al., USPTO, Notice of Office Communication, dated Mar. 19, 2009, U.S. Appl. No. 11/404,979, 17 pages.

O'Donnell et al., USPTO, Notice of Office Communication, dated Jun. 3, 2008, U.S. Appl. No. 11/404,979, 15 pages.

Herschler et al., USPTO, Notice of Office Communication, dated Dec. 1, 2008, U.S. Appl. No. 11/671,598, 20 pages.

Carlson et al., USPTO, Notice of Office Communication, dated Oct. 14, 2008, U.S. Appl. No. 11/531,872, 25 pages.

Carlson et al., USPTO, Notice of Office Communication, dated Apr. 10, 2009, U.S. Appl. No. 11/531,872, 43 pages.

Carlson et al., USPTO, Notice of Office Communication, dated Mar. 30, 2009, U.S. Appl. No. 11/531,977, 14 pages.

Herschler et al, USPTO, Notice of Office Communication, dated Aug. 7, 2009, U.S. Appl. No. 11/671,625, 76 pages.

Herschler et al, USPTO, Notice of Office Communication, dated Dec. 31, 2008, U.S. Appl. No. 11/671,625, 73 pages.

Herschler et al, USPTO, Notice of Office Communication, dated Oct. 17, 2008, U.S. Appl. No. 11/671,679, 20 pages.

Herschler et al, USPTO, Notice of Office Communication, dated May 8, 2009, U.S. Appl. No. 11/671,679, 29 pages.

Herschler et al, USPTO, Notice of Office Communication, dated Oct. 6, 2009, U.S. Appl. No. 11/671,679, 29 pages.

EP Examination Process Guide—Section 9-Participant Rights-Participant Events-Distributions, IRS, Sep. 30, 2009, 3 pages.

Internal Revenue Bulletin 2005-51, Dec. 19, 2005, 53 pages,.

Financial Instrument, Definition, Dictionary of Financial Terms, 3 pages, printed Mar. 31, 2009.

Pursuant, Definition, Webster Dictionary, 2009 Interapple, Inc., 1 page, Printed Mar. 31, 2009.

Herschler et al, USPTO, Notice of Office Communication, dated Oct. 28, 2009, U.S. Appl. No. 11/531,872, 16 pages.

Herschler et al., USPTO, Notice of Office Communication, dated Jun. 26, 2009, U.S. Appl. No. 11/671,598, 23 pages.

Herschler et al., USPTO, Notice of Office Communication, dated Dec. 10, 2009, U.S. Appl. No. 11/671,598, 25 pages.

\* cited by examiner

FINANCIAL INSTRUMENT UTILIZING A CUSTOMER SPECIFIC DATE

RELATED APPLICATION

This application is related to U.S. application Ser. No. 11/270,860 filed Apr. 14, 2006, which Claims priority to U.S. Provisional Application Ser. No. 60/703,630 filed Jul. 29, 2005.

TECHNICAL FIELD OF THE INVENTION

This invention relates generally to financial instruments and more particularly to a financial instrument utilizing a customer specific date.

BACKGROUND OF THE INVENTION

There are numerous financial instruments available on the market and people invest in them for a variety of reasons. Some investors are interested in obtaining high rates of return on their investments, while others are willing to forego high rates of return in exchange for a reduced level of financial risk. Some investors are interested in obtaining a steady income stream for a period of years or possibly for life. When making decisions regarding the selection of a financial instrument, there are multiple tradeoffs. Typically, the lower the risk is, the lower the expected rate of return will be.

In addition to risk and return, there are numerous tax consequences that may be considered in selecting a financial instrument. For example, tax-deferred investments are typically preferred. Tax-deferred investments are investments that satisfy one or more regulatory requirements that allow for contributions to the investment with pre-tax dollars and/or that allow the investment to grow tax-free for a period of time. Tax-deferred investments may be included within, for example, 401(a), 401(k), 403(b), and 457 employee retirement plans, qualified or non-qualified annuities, and individual retirement accounts (IRAs). Some typical employee retirement plans and IRAs allow investors to choose among a variety of investments and to move funds between these chosen investments.

SUMMARY OF THE INVENTION

According to one embodiment of the invention, a financial instrument issued to a customer includes an account and a guarantee of a protected value. The account has an account balance that changes over time, wherein at least part of the account balance is based on an initial deposit into the account. The protected value is fixed at the time of a particular event at a value at least equal to the greatest of the initial deposit, the account balance at the time of the particular event, and the highest value of the account balance on at least one anniversary of a customer specific date between the date of the initial deposit and the time of the particular event. The customer specific date is specific to the customer, determined no later than the time the financial instrument is issued to the customer, and independent of any transaction specific date related to the financial instrument, including the date of the initial deposit.

Certain embodiments of the present invention may provide various technical advantages. For example, the invention may allow an account holder to maintain liquidity in an account while at the same time receiving a guarantee of lifetime income and a guaranteed growth rate. Certain embodiments may also allow an account holder to receive the potentially higher rates of return associated with variable investments while at the same time avoiding the associated risk of loss by obtaining a guaranteed growth rate. Certain embodiments of the present invention may provide for the portability of one or more features of an investment between different financial instruments.

Certain embodiments may allow an issuer to diversify risks associated with issuing numerous financial instruments. Certain embodiments may provide for improved customization for a customer purchasing a financial instrument. Certain embodiments may allow a customer to purchase a financial instrument having one or more guarantees on a first date and then add one or more additional guarantees at a later date. Certain embodiments may provide one or more of these advantages for both an account holder and their spouse. Certain embodiments may provide one or more of these advantages in a tax-deferred investment.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE EXAMPLE EMBODIMENTS

It should be understood at the outset that although example implementations of embodiments of the invention are illustrated below, the present invention may be implemented using any number of techniques, whether currently known or not. The present invention should in no way be limited to the example implementations, drawings, and techniques illustrated below. Additionally, the drawings are not necessarily drawn to scale.

Figure 1:
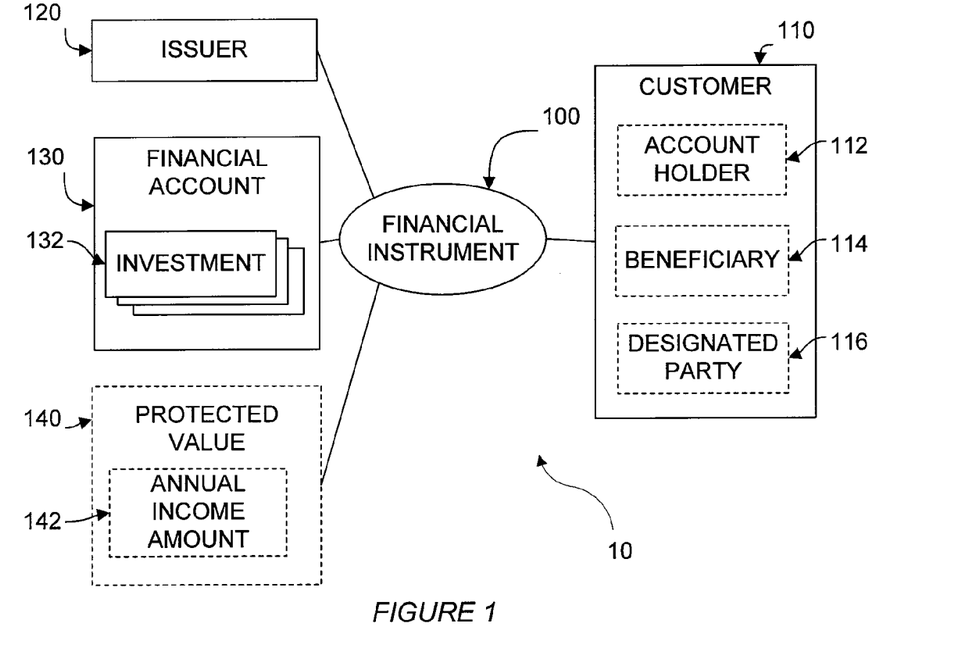
FIG. 1 illustrates a system for providing a financial instrument according to a particular embodiment of the present invention.

FIG. 1 illustrates a system 10 for providing financial instrument 100 according to a particular embodiment of the present invention. System 10 may interact with customer 110 and issuer 120; and system 10 may utilize account 130 and protected value 140. Financial instrument 100 may represent a contract between customer 110 and issuer 120. Financial instrument 100 may include certain provisions as described below in relation to FIG. 2.

According to certain embodiments, system 10 may be utilized to provide financial instrument 100 to customer 110, such that customer 110 may make a deposit and retain liquidity, while also receiving the benefit of a guarantee of lifetime payments and/or the security associated with a guaranteed growth rate. According to certain embodiments, system 10 may be utilized to provide financial instrument 100 to customer 110, such that one or more features associated with financial instrument 100 may be portable.

Customer 110 may broadly refer to one or more of an account holder 112, a beneficiary 114, a designated party 116, and/or one who purchases financial instrument 100 for another person or entity. In certain embodiments, account holder 112 may represent a party who purchases financial instrument 100 and/or who is attributed as being an owner of account 130. In certain embodiments, account holder 112 may have one or more ownership rights in account 130. For example, account holder 112 may have the right to terminate financial instrument 100, to make investment decisions for account 130, to identify one or more beneficiaries 114, to identify one or more designated parties 116, and/or to make deposits into account 130. In a particular embodiment, account holder 112 may be the entity or entities who have tax liability for the transactions related to account 130.

In certain embodiments, beneficiary 114 may represent a party who may receive payments and/or make withdrawals in accordance with the terms of financial instrument 100. In certain embodiments, designated party 116 may represent an individual, group of individuals, and/or other entity that may be designated for purposes of determining death benefits, lifetime payments, fees, guaranteed rates, and/or other features of financial instrument 100. For example, guaranteed rates and/or fees may be determined based upon the age, gender, and/or health of designated party 116. As another example, death benefit provisions may be based upon the death of designated party 116.

In certain embodiments, one or more of account holder 112, beneficiary 114, and designated party 116 may be the same party. In certain embodiments, financial instrument 100 may be purchased by account holder 112 for the benefit of beneficiary 114, with designated party 116 being the designated life for the guarantee of lifetime payments.

In certain embodiments, one or more of account holder 112, beneficiary 114, and designated party 116 may be related. For example, designated party 116 and beneficiary 114 may be related as husband and wife. As another example, account holder 112 may be an employer and an employee may be both beneficiary 114 and designated party 116. Alternatively, account holder 112 and beneficiary 114 may be the same individual or entity. In some embodiments, an employer might purchase account 130 for account holder 112. Also, financial instrument 100 may have multiple account holders 112, beneficiaries 114, and/or designated parties 116. For example, a husband and a wife may both be beneficiaries 114 and designated parties 116. As another example, two or more business partners could be designated parties 116. While this patent describes various actions, benefits, steps, etc. in relation to a customer 110, account holder 112, beneficiary 114, and/or designated party 116, those descriptions should not be construed as limiting because financial instrument 100 might provide for various persons to exercise control, take various actions, receive certain benefits, and/or affect certain features with regard to financial instrument 100.

Issuer 120 may represent an entity that provides and/or sells financial instrument 100 to customer 110. Issuer 120 may represent a bank, an insurance company, mutual fund company, or other business entity engaged in the sale of one or more financial instruments. Issuer 120 may also represent multiple entities that operate together to provide or sell financial instrument 100.

Account 130 may represent a principal balance including amounts deposited by customer 110 (and/or transferred from a separate account) together with accrued growth due to a return on one or more investments. The value of account 130 may be distributed among one or more investments 132. Investment 132 may provide a fixed or variable return, and the value of account 130 may be distributed among any combination of investments 132, such as municipal bonds, bond funds, money market accounts, corporate securities, index funds, mutual funds, real estate investment trusts, or any other appropriate type of investments. In certain embodiments, account 130 may include one or more investments 132 associated with multiple financial entities. In certain embodiments, the value of account 130 may be withdrawn in whole or in part at the discretion of customer 110. In various embodiments, issuer 120 may restrict the investments 132 available to customer 110 or allow customer 110 to accept certain limitations in exchange for other benefits. Account 130 may or may not be associated with issuer 120. In some embodiments, a third party administering account 130 may contract with issuer 120 to provide the guarantees. An insurance company, for example, might provide the guarantees for mutual fund accounts administered by a third party or for other types of financial accounts.

In certain embodiments, where appropriate regulatory requirements are met, account 130 may represent a tax-deferred account. In embodiments where account 130 represents a tax-deferred account, customer 110 may make one or more deposits into account 130 using pre-tax funds and/or account 130 may be permitted to grow tax-free for a period of time. As used herein, the term "tax" may refer to one or more taxes levied by a federal, state, and/or any other appropriate taxing authority.

Protected value 140 represents a value all or a portion of which issuer 120 guarantees that beneficiary 114 will be able to receive. Protected value 140 may be based upon the value of account 130 at some point in time. In some embodiments, although account 130 may decrease due to market fluctuations, protected value 140 does not, thus providing a guaranteed rate of return regardless of market performance. In certain embodiments, protected value 140 may be based upon a deposit and the deposit may include an account balance from an existing contract. Thus, in some embodiments, the guarantees described herein may be added to existing financial instruments after the passage of time. In certain embodiments, protected value 140 may be based upon a substantially similar value from a separate financial instrument.

In certain embodiments, the amount and/or the guaranteed percentage of protected value 140 may vary based on certain characteristics of customer 110. For example, the guaranteed percentage of protected value 140 (or protected value 140 itself) may vary based upon the gender, age, and/or health status of one or more of account holder 112, beneficiary 114, and designated party 116. In certain embodiments, the amount and/or the guaranteed percentage of protected value 140 may vary depending upon whether and to what extent customer 110 accepts certain limitations on flexibility and/or control over account 130 and/or distributions therefrom. In certain embodiments, the amount and/or the guaranteed percentage of protected value 140 may vary depending on the timing of one or more events.

In certain embodiments, protected value 140 may be calculated at the time that financial instrument 100 is purchased, and in other embodiments protected value 140 may be calculated at the end of a certain period of time, upon the happening of a triggering event, or on a periodic basis. In some embodiments, protected value 140 may be based upon a combination of factors and calculated at different times. Depending upon the embodiment, protected value 140 may become fixed at some point in time. For example, protected value 140 may become fixed at the time of the first discretionary withdrawal from account 130 by customer 110. In certain embodiments, protected value 140 may become fixed at the time that one or more deposits are made into account 130. In certain embodiments, protected value 140 may become fixed upon an election by customer 110.

Numerous methods may be used to fix protected value 140 at some point in time. For example, protected value 140 may be calculated as equal to the value of account 130 at the time of the first withdrawal by customer 110. Alternatively, protected value 140 may be calculated as the highest value of account 130 at one or more specified times or at any time. For example, protected value 140 may be calculated as the highest value of account 130 on each of the first ten anniversary dates, where the anniversary date may be an anniversary of the purchase date of financial instrument 100, a birthday of customer 110, a wedding date for customer 110, or a date specified by customer 110. In embodiments where a calculation is based on an anniversary date, when the anniversary date falls on a weekend, holiday, or other non-business day, the calculation may be based on the immediately preceding business day (or, alternatively, on the next business day).

In embodiments in which the calculation of protected value 140 (or any other feature of financial instrument 100) is based on a birthday of customer 110, a wedding date for customer 110, or a date specified by customer 110, financial instrument 100 may advantageously provide enhanced customization by customer 110 and may reduce the number of critical dates that customer 110 may need to consider. In addition, through the use of one of these dates, issuer 120 may diversify the risk and reduce any seasonal overhead cost associated with issuing numerous financial instruments 100, all having identical issuing dates (as may occur if a critical date is associated with a calendar year, a fiscal year, or the initiation of a group plan for a large number of employees on the same date).

In certain embodiments, protected value may be calculated as the greater of multiple calculation methods. For example, protected value 140 may be calculated as the value of account 130 on the date of first withdrawal or the highest value of account 130 on the first ten anniversary dates, but in no event less than the initial value of account 130 growing at a five percent growth rate for the first ten years. As another example, protected value 140 may be calculated as the value of account 130 on the date of first withdrawal, or the highest value of account 130 on each anniversary of the birthday of account holder 112 between the date that financial instrument 100 was purchased and the date of the first withdrawal, but in no event less than the initial value of account 130 growing at a five percent growth rate until earliest of the business day prior to the first withdrawal or the date that account holder 112 turns seventy. In certain embodiments, the growth rate utilized in these examples may alternatively be three percent, four percent, six-percent, or based on an index.

In certain embodiments, protected value 140 may be calculated based upon the value of account 130 prior to the inclusion of any bonuses. Alternatively, in certain embodiments, protected value 140 may be calculated based upon the value of account value 130 with additional bonuses (or other incentives) added. For example, issuer 120 may pay a bonus to entice customers to purchase the guarantees discussed herein. The invention may include any method of determining protected value 140.

In certain embodiments, the amount and/or the guaranteed percentage of protected value 140 may change after it has been initially determined. As one example, the amount and/or guaranteed percentage of protected value 140 may change based upon changes in the law. As another example, the amount and/or guaranteed percentage of protected value 140 may change based upon an inflationary index, interest rate, or exchange rate. As yet another example, the amount and/or guaranteed percentage of protected value 140 may change based upon changes in the health or age of customer 110.

In certain embodiments, customer 110 may be allowed to step-up protected value 140 at specified times or at any time. For example, following an election to step-up protected value 140, protected value 140 may be set as equal to the current value of account 130. In a particular embodiment, customer 110 may elect to step-up protected value 140 at any time after the fifth anniversary of the first withdrawal, with additional step-ups being available five years after the date of the previous step-up election. A step-up in protected value 140 may require further deposits to account 130.

In certain embodiments, protected value 140 may be automatically stepped-up on a periodic basis or upon the happening of particular events. For example, an automatic step-up of protected value 140 may occur on a monthly, quarterly, or yearly basis. In a particular embodiment, a step-up to protected value 140 may automatically occur on an annual basis after the first withdrawal, with protected value 140 being set as equal to the greatest of the value of financial account 130 on the previous quarterly anniversaries if that amount is greater than the current protected value 140. In alternative embodiments, monthly, bi-monthly, semi-annual, or any other appropriate anniversary may be used and automatic step-ups may occur on a semi-annual, quarterly, monthly, or any other appropriate basis.

In certain embodiments, customer 110 may be allowed to step-up protected value 140 or protected value 140 may be automatically stepped-up on an annual basis associated with an anniversary date. In certain embodiments, the anniversary date may be an anniversary of the purchase date of financial instrument 100, a birthday of customer 110, a wedding date for customer 110, or a date specified by customer 110. In these embodiments, when the anniversary falls on a weekend, holiday, or other non-business day, protected value 140 may be stepped-up on the immediately preceding business day (or, alternatively, on the next business day).

In certain embodiments, rather than setting protected value 140 as equal to the value of account 130 on a certain anniversary, protected value may be set as a percentage of such a value, as a certain value appreciated at a specified growth rate, or as any other appropriate value. In certain embodiments, the step-up value for protected value 140 may take into consideration any additional purchase payments and adjustments to these purchase payments.

In certain embodiments, certain provisions of financial instrument 100 may be managed through the use of annual income amount 142. For example, a guarantee of lifetime payments may be managed by calculating annual income amount 142 and evaluating discretionary withdrawals in relation to annual income amount 142. For example if the cumulative withdrawals for a certain year exceed annual income amount 142, then annual income amount 142 may be reduced accordingly for future years. Further explanation of the operation of a certain embodiment with respect to protected value 140 and annual income amount 142 is included below in relation to FIGS. 3A and 3B.

In the operation of certain embodiments, customer 110 may purchase financial instrument 100 from issuer 120 (or an agent thereof). In some cases, the purchase may occur electronically. Issuer 120 may then create account 130 and associate one or more deposits made by customer 110 with account 130. In certain embodiments, customer 110 may make investment choices regarding the allocation of funds associated with account 130. Protected value 140 may be calculated using one or more specified calculation methods.

In some embodiments, following the purchase of financial instrument 100, customer 110 may make additional deposits to and/or discretionary withdrawals from account 130. Withdrawals from account 130 may or may not be required or allowed based upon the terms of financial instrument 100. The timing of withdrawals may or may not be regulated by financial instrument 100. In certain embodiments, withdrawals can be taken as separate partial withdrawals or as systematic withdrawals. For example, withdrawals may be automated and may be set up on a periodic basis, with the period being yearly, quarterly, monthly, etc.

Although financial instrument 100 has been described as being purchased directly from issuer 120 in certain embodiments, financial instrument 100 may be purchased through one or more intermediaries.

Figure 2:
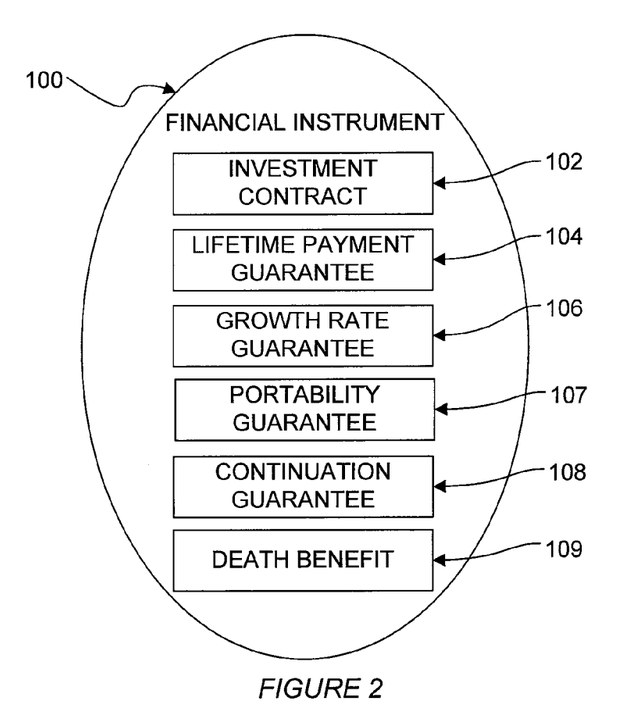
FIG. 2 illustrates a financial instrument according to a particular embodiment.

FIG. 2 illustrates a particular embodiment of financial instrument 100. In the embodiment shown, financial instrument 100 includes investment contract 102, lifetime payment guarantee 104, growth rate guarantee 106, portability guarantee 107, continuation guarantee 108, and death benefit 109. Investment contract 102 may represent a contract for a broad range of investment products. For example, investment contract may represent an individual or group annuity, mutual fund contract, individual retirement account contract, and/or an employee retirement plan contract, such as a 401(a) contract, a 401(k) contract, a 403(b) contract, and/or a 457 contract. In a particular embodiment, investment contract 102 may represent a discretionary group variable annuity contract.

In addition to the basic terms of investment contract 102, financial instrument 100 may include additional provisions including lifetime payment guarantee 104, growth rate guarantee 106, portability guarantee 107, continuation guarantee 108, and death benefit 109. Although investment contract 102, lifetime payment guarantee 104, growth rate guarantee 106, portability guarantee 107, continuation guarantee 108, and death benefit 109 are shown as separate elements, one or more of these elements may be combined, and each of these elements may also include numerous components.

In certain embodiments, different elements of financial instrument 100 may be purchased or elected at different times. For example, investment contract 102 may be purchased in year one, and lifetime payment guarantee 104 and growth rate guarantee 106 may be purchased or elected in year one or at anytime thereafter. In certain embodiments, the scope or provisions of one or more of lifetime payment guarantee 104, growth rate guarantee 106, portability guarantee 107, continuation guarantee 108, and death benefit 109 may be modified after the purchase of investment contract 102. For example, investment contract 102 may be purchased with lifetime payment guarantee 104, such that issuer 120 guarantees that beneficiary 114 will receive payments for the life of designated party 116, with designated party 116 and beneficiary 114 being the same individual. Then, according to this example, at a later date, an election may be made to expand the scope of lifetime payment guarantee 104, such that issuer 120 guarantees that beneficiary 114 will receive payments for the life of designated party 114, with designated party 116 and beneficiary 114 being both the individual and the spouse of the individual.

In certain embodiments, lifetime payment guarantee 104 may include provisions guaranteeing that beneficiary 114 may receive financial transfers for life, beginning at or after a specified triggering event. For example, in certain embodiments, these financial transfers may be due to discretionary withdrawals and/or payments. In certain embodiments, the amount of (and/or a limit for) these financial transfers may be fixed or variable. For example, the amount of (and/or a limit for) these financial transfers may be determined based upon the age, gender, health status, and/or other morbidity factors for one or more individuals. As another example, the amount of (and/or a limit for) these financial transfers may be independent of such factors. In certain embodiments, the amount of (and/or the limit for) these financial transfers may change after a period of time according to a set schedule, changes in an external index, and/or any appropriate factor.

In certain embodiments, the amount of (and/or a limit for) these financial transfers may be determined based upon specified percentages of protected value 140. For example, the amount of (and/or a limit for) these financial transfers may be set at a first percentage for a certain period and then change to second percentage for another period. In certain embodiments, these percentages may be fixed upon the effective date of lifetime payment guarantee 104, upon the date of a first financial transfer, or upon any other appropriate date. In certain embodiments, the amount of (and/or a limit for) these financial transfers may vary based on the age of customer 110 on the date of a first financial transfer.

For example, in a particular embodiment, the amount of (and/or a limit for) these financial transfers may be a first percentage of protected value 140 per year when the date of the first financial transfer is prior to the date customer 110 turns a threshold age and may be a second percentage of protected value 140 per year when the date of the first financial transfer is on or after the date that customer 110 turns the threshold age. In a particular embodiment, the threshold age may be sixty-five, the first percentage may be four percent, and the second percentage may be five percent, although any percentage and any threshold may be used. In an alternative embodiment, multiple threshold ages may be establish to distinguish between three or more amounts of (and/or limits for) these financial transfers.

In certain embodiments, lifetime payment guarantee 104 may guarantee that beneficiary 114 will receive no less than annual income amount 142 each year for the life of designated party 116, beginning with an event. In certain embodiments, annual income amount 142 may be four percent, five percent, or six percent of protected value 140, but any percentage of any measured amount could be used. In certain embodiments, each measuring year for annual income amount 142 may be determined based on an anniversary date, where the anniversary date may be an anniversary of the purchase date of financial instrument 100, a birthday of customer 110, a wedding date for customer 110, or a date specified by customer 110. In certain embodiments, protected value 140 may be adjusted upwards or downwards based on certain events. For example, protected value 140 may be increased by additional deposits and may be decreased by cumulative withdrawals in a single year that exceed annual income amount 142.

In certain embodiments, growth rate guarantee 106 may include provisions allowing customer 110 to make withdrawals from account 130 based upon deposits made by customer 110. The provisions may further provide that the withdrawals may be made from a value that is guaranteed to grow at a specified fixed or variable rate for a specified period of time. For example, growth rate guarantee 106 may allow beneficiary 114 to make withdrawals from protected value 140, with protected value 140 guaranteed to be no less than the value of customer deposits growing at a fixed five percent per year for ten years from the date of the first deposit or until the date of the first withdrawal, whichever is sooner.

In certain embodiments, the specified rate for growth rate guarantee 106 may be any positive fixed value. In certain embodiments, the specified rate for growth rate guarantee 106 may be zero or a fixed negative value. In embodiments where the specified rate is zero or a fixed negative value, the beneficial aspects of growth rate guarantee 106 may include a reduction in risk for customer 110. In certain embodiments, the specified rate may be based on one or more variable indices. For example, the specified rate may be based on the Consumer Price Index, a stock market index, and/or the Federal Reserve's discount rate.

In certain embodiments, the specified rate may vary depending on the timing of deposits, the size of deposits, and/or the value of investments 132. For example, different rates may apply to different deposits or the overall rate may be calculated based on the rates in effect at the time that deposits are made, weighted based on the relative size (or actual size) of the deposits. In certain embodiments, the specified rate may vary based on characteristics of account holder 112, beneficiary 114, and/or designated party 116. For example, the specified rate may vary depending on the gender, age, or health status of designated party 116.

In certain embodiments, the guaranteed growth may be set at a first rate for a specified period of time, or until a specified event occurs, and then change to a second rate. For example, the guaranteed growth rate may be zero for the first two years and then may change to a fixed five percent growth rate for the next eight years. In certain embodiments, the growth rate may change numerous times, with the changes occurring based upon specified periods of time and/or upon the occurrence of specified events.

In certain embodiments, portability guarantee 107 may include provisions allowing customer 110 to transfer all or a portion of account 130 to a separate financial instrument together with one or more features of financial instrument 100. For example, in certain embodiments, portability guarantee 107 may include provisions guaranteeing that issuer 120 will make available to customer 110 a financial instrument substantially similar to financial instrument 100 such that if customer 110 transfers all or a portion of account 130 to the separate financial instrument, then all or a portion of protected value 140 or annual income amount 142 may be retained by customer 110 under the separate financial instrument. Additional details for certain embodiments of portability guarantee 107 are provided below in relation to FIG. 4.

In certain embodiments, continuation guarantee 108 may include provisions allowing one or more features of a separate financial instrument to be transferred to financial instrument 100 together with a financial transfer from the separate financial instrument into account 130. For example, in a particular embodiment, one or more of protected value 140 and annual income amount 142 may be set as equal to all or a portion of a substantially similar value associated with the separate financial instrument. Additional details for certain embodiments of continuation guarantee 108 are provided below in relation to FIG. 4.

In embodiments of financial instrument 100 including death benefit 109, death benefit 109 may include provisions allowing for payments to be made to a recipient designated by account holder 112 and/or beneficiary 114, upon the death of designated party 116. For example, payments made under death benefit 109 may be made to beneficiary 114 upon the death of designated party 116, where designated party 116 is account holder 112. As another example, payments made under death benefit 109 may be made to an identified third party beneficiary upon the death of designated party 116 or beneficiary 114. Death benefit 109 may provide for payment of an amount based upon the value of account 130, protected value 140, or some other value identified in death benefit 109. For example, death benefit 109 may provide for payment in the amount of the value of account 130 at the time of death. As another example, death benefit 109 may provide for payment in the amount of the highest value of account 130 on any anniversary of the effective date of financial instrument 100. In certain embodiments, death benefit 109 may provide for payment in the amount of the highest of multiple calculation methods. Although death benefit 109 has been illustrated and described as a separate element of financial instrument 100, death benefit 109 may be formed from multiple components and/or may be included as part of another element of financial instrument 100.

In certain embodiments, financial instrument 100 may provide for an option allowing customer 110 to elect to receive the present value of future guaranteed payments. For example, in embodiments where the charge for lifetime payment guarantee 104 is an up-front charge, financial instrument 100 may allow for customer 110 to cancel lifetime payment guarantee 104 and receive a payment (or credit to account 130) calculated based upon the present value of the guarantee. In these embodiments, the calculation may or may not include an underwriting assessment of the life expectancy of customer 110.

As indicated above, in certain embodiments, financial instrument 100 may provide for multiple beneficiaries 114 and financial instrument 100 may provide for various persons to exercise control. For example, financial instrument 100 may provide that both a husband and a wife are beneficiaries 114 and designated parties 116. Financial instrument 100 may further provide that the husband may make discretionary withdrawals from account 130 and, if the husband predeceases the wife, that the wife may make discretionary withdrawals from account 130 after the husband's death. Additionally, financial instrument 100 may further provide that if account value 130 reaches zero during the husband's life, then the husband may receive periodic payments for life and then, upon his death, the wife may receive periodic payments for her life. In certain embodiments, financial instrument 100 may include similar provisions for business partners or other arrangements involving multiple beneficiaries 114 and/or designated parties 116.

The costs associated with each element of financial instrument 100 may be assessed together or as separate charges, and the charges may be assessed in different ways. For example, the costs may be assessed as up-front charges, as asset charges, or as charges against withdrawals or payments. In certain embodiments, the costs may be charged periodically and/or may vary over time. For example, there may be no charge for a period of time and/or the charge may increase or decrease over time depending on a variety of factors. In certain embodiments, the costs may be charged in a manner such that the charge is assessed pro-rata over multiple investments or accounts 130, according to an election by customer 110, and/or such that the tax consequences of the charge are substantially minimized. In a particular embodiment, the charge for each element is assessed as a daily asset charge against the value of account 130. For example, the charge assessed for lifetime payment guarantee 104 and growth rate guarantee 106 may be an eighty-five basis point charge (0.85 percent per year) assessed against the daily balance of account 130. In embodiments in which both a husband and a wife are beneficiaries 114 and designated parties 116, the charge assessed for lifetime payment guarantee 104 and growth rate guarantee 106 may be a 135 basis point charge (1.35 percent per year) assessed against the daily balance of account 130. In certain embodiments, financial instrument 100 may allow customer 100 to purchase financial instrument 100 and then defer the decision as to whether to include both husband and wife as beneficiaries 114 and/or designated parties 116 until a later date. In a particular embodiment, financial instrument 100 may allow customer 110 to wait until the time of a first withdrawal from account 130 to decide whether to include both a husband and a wife as beneficiaries 114 and designated parties 116. In these particular embodiments, the charge assessed for lifetime payment guarantee 104 and growth rate guarantee 106 may be an eighty-five basis point charge (0.85 percent per year) assessed against the daily balance of account 130 during the accrual phase and a 135 basis point charge (1.35 percent per year) assessed against the daily balance of account 130 during the distribution phase. As yet another example, the charge assessed for death benefit 109 may be a 140 basis point charge (1.40 percent per year) assessed against the daily balance of account 130.

In certain embodiments, one or more features of financial instrument 100 may be dependent upon an age of customer 110. For example, in certain embodiments, customer 110 may not be eligible to purchase and/or utilize certain features of financial instrument 100 before customer 100 attains a specified age. In a particular embodiment, customer 110 may not be eligible for one or more guarantees prior to attaining the age of fifty. In particular embodiments, where customer 110 represents multiple individuals, the age utilized to determine eligibility may be the age of the youngest individual. For example, if designated party 116 includes both a husband and a wife, then one or more guarantees may not be available until both the husband and the wife attain the age of fifty.

Figure 3A:
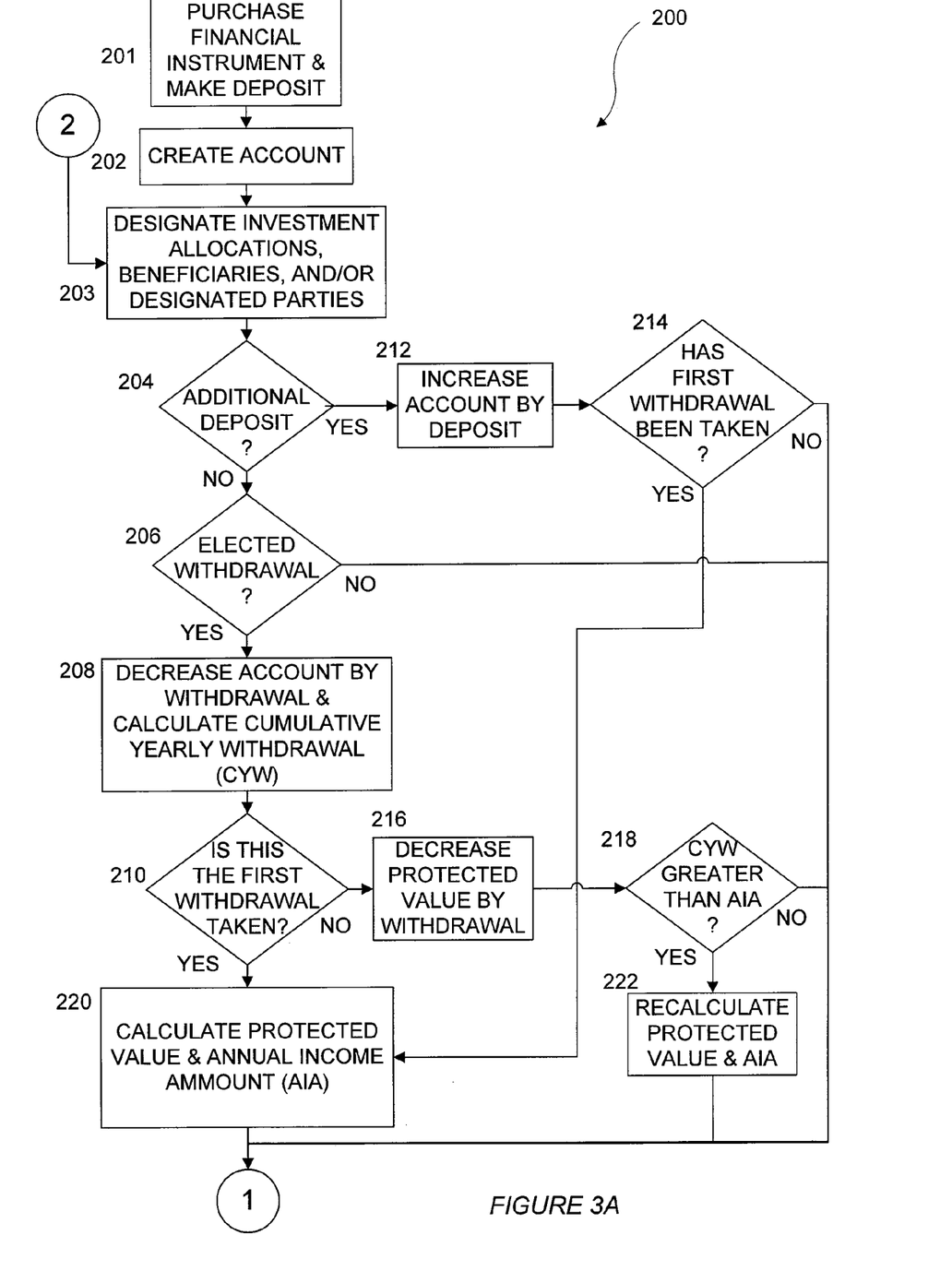
FIGS. 3A and 3B provide a flowchart illustrating the operation of a financial instrument according to a particular embodiment.
Figure 3B:
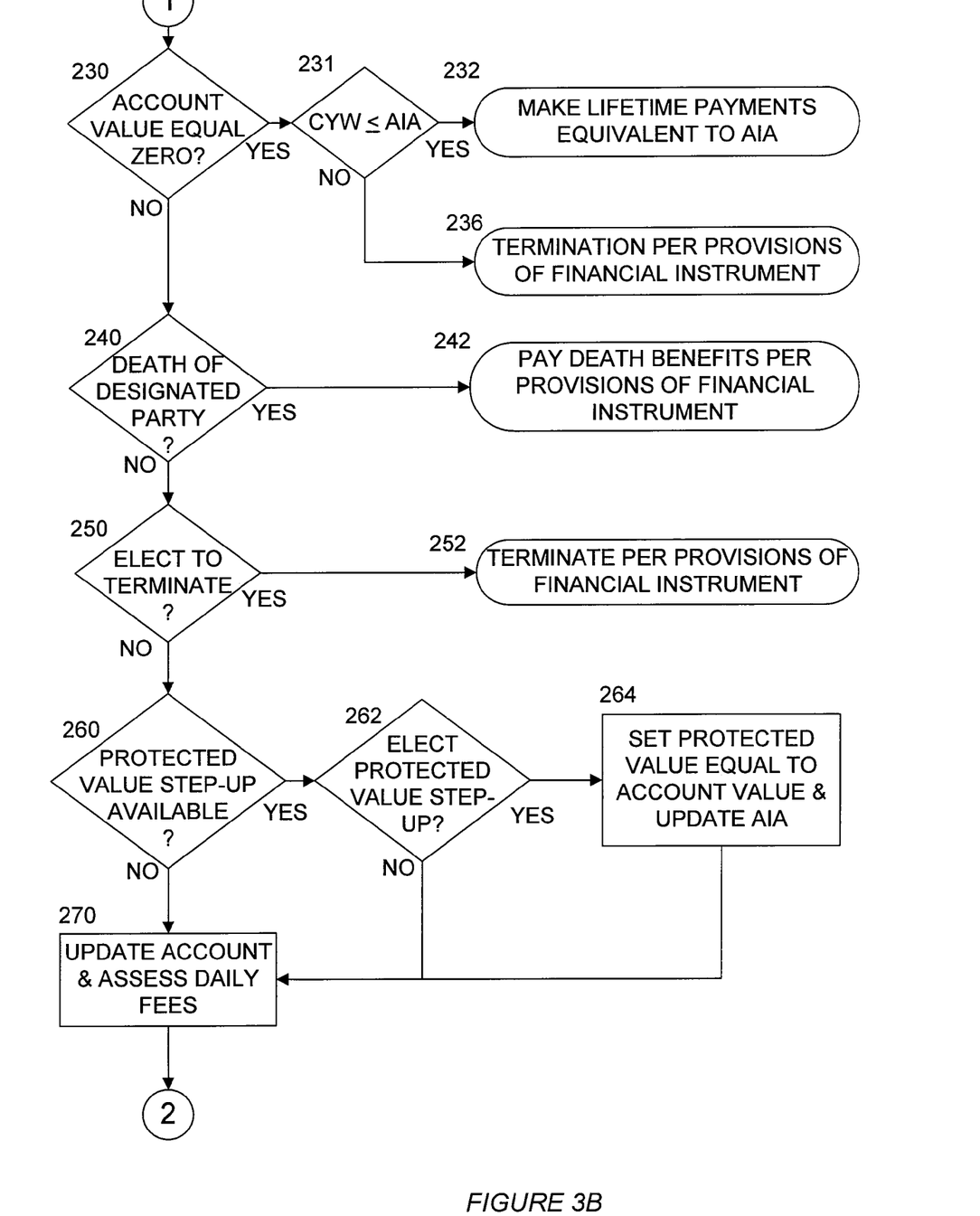

FIGS. 3A and 3B provide flowchart 200 which illustrates the operation of financial instrument 100 according to a particular embodiment. Flowchart 200 traces a few of the possible scenarios that are available to customer 110 following the purchase of an embodiment of financial instrument 100. Flowchart 200 is intended to demonstrate an embodiment of financial instrument 100 in which certain features of financial instrument 100 are paid for on a daily basis through the use of a daily fee assessment, assessed on a daily basis against the value of account 130. Accordingly, although in certain embodiments more than one of the elected actions identified in flowchart 200 may be taken on the same day, flowchart 200 assumes that only one elected action will be taken for any given day.

According to flowchart 200, at step 201, customer 110 may make one or more initial deposits and purchase financial instrument 100, including lifetime payment guarantee 104 and growth rate guarantee 106. At step 202, account 130 is created. Customer 110 may designate investment allocations for account 130, one or more beneficiaries 114, and/or one or more designated parties 116, at step 203. If additional deposits are made by customer 110, at step 204, then the value of account 130 is increased by the amount of the additional deposits, at step 212. In some cases, a fee may be deducted from the additional deposits. If an elected withdrawal is taken at step 206, then the value of account 130 is decreased by the amount of the withdrawal and the cumulative yearly withdrawal is calculated at step 208. If the withdrawal is the first withdrawal taken in relation to financial instrument 100, at step 210, then protected value 140 and annual income amount are calculated at step 220. Similarly, if additional deposits are made by customer 110 at step 204 and the first withdrawal has already been taken at step 214, then protected value 140 and annual income amount 142 are calculated at step 220. In some embodiments, the additional deposits may not change some or all of these values. If the withdrawal is not the first withdrawal taken in relation to financial instrument 100, at step 210, then protected value 140 is decreased by the amount of the withdrawal at step 216. If the cumulative yearly withdrawal exceeds annual income amount 142, at step 218, then protected value 140 and annual income amount 142 are recalculated at step 222. These and other calculations are discussed in more detail below.

If the value of account 130 is equal to zero, at step 230, then there may be multiple possible alternative outcomes. If the value of account 130 is equal to zero at step 230 and cumulative yearly withdrawals are less than or equal to annual income amount 142 at step 231, then lifetime benefit payments may be made to customer 110 in an amount equivalent to annual income amount 142, at step 232. If the value of account 130 is equal to zero at step 230 and cumulative yearly withdrawals are greater than annual income amount 142, then financial instrument 100 may be terminated in accordance with the provisions of financial instrument 100, at step 236.

If financial instrument 100 includes death benefit 109 and if customer 110 dies, at step 240, then payments are made pursuant to the provisions of death benefit 109, at step 242. If customer 110 elects to terminate one or more provisions of financial instrument 100, at step 250, then those provisions are terminated in accordance with the terms of financial instrument 100, at step 252.

If a step-up for protected value 140 is available at step 260 and if customer 110 elects a step-up for protected value 140 at step 262, then protected value 140 is set as equal to the current value of account 130 and annual income amount 142 and annual withdrawal amount 144 are updated, at step 264. In some embodiments, step 262 may be omitted and the step-up may be automatic. Account 130 may be updated to reflect daily changes in investments 132 and daily fees may be assessed against account 130, at step 270.

The calculations identified in flowchart 200 are dependent upon the particular features of financial instrument 100. Included below are example calculations for particular embodiments of financial instrument 100. In the example calculations described below, financial instrument 100 is treated as including investment contract 102, lifetime payment guarantee 104, and growth rate guarantee 106. For the purpose of these calculations growth rate guarantee 106 is treated as a guarantee of a five percent growth rate for the first ten years, and lifetime payment guarantee 104 is treated as a guarantee of five percent payments for life. Unless otherwise indicated, it will be assumed that financial instrument 100 was purchased with an initial deposit and no additional deposits have been made. Also, unless indicated otherwise, all interest is assumed to be compounded daily.

Each time that a withdrawal is made, the value of account 130 may be reduced by the amount of the withdrawal. In one embodiment, on the date of the first withdrawal, protected value 140 may be set at the greater of the current value of account 130 or the initial value of account 130 growing at five percent per year compounded. Using these assumptions, on the date of the first withdrawal, annual income amount 142 may be set at five percent of protected value 140 at the time that protected value 140 is initially determined. In particular embodiments, the percentage and/or method of determining annual income amount 142 may vary.

For example, suppose an initial deposit of $100,000 is made on Apr. 1, 2005. The first withdrawal takes place on Feb. 1, 2006 when the value of account 130 is equal to $102,500. Protected value 140 would initially be calculated as the greater of $102,500 or $104,175.16.

$$\$100,000 \times (1.05)^{(306/365)} = \$104,175$$

Thus, protected value 140 would be $104,175. After the initial protected value 140 is calculated, the withdrawal amount may be subtracted from account 130 and protected value 140. Accordingly, based on the assumptions above, annual income amount 142 would initially be $5,208.75.

$$\$104,175 \times 0.05 = \$5,208.75$$

If the cumulative withdrawals in a given year exceed annual income amount 142, protected value 140 and annual income amount 142 are recalculated. Suppose that the current value of account 130 is $55,000 and annual income amount 142 is $5,000. The first withdrawal during the applicable year is $7,000, which is $2,000 greater than annual income amount 142. The first step in the calculation would be to subtract annual income amount 142 from the current value of account 130. Thus, the value of account 130 would be reduced to $50,000. ($55,000−$5,000=$50,000) The next step is to calculate the new annual income amount 142. Annual income amount 142 would decrease according to the percentage of the excess amount to the value of account 130 prior to the excess being deducted. Thus, annual income amount 142 would drop to $4,800 for subsequent years.

$$(1-(\$2,000/\$50,000)) \times \$5,000 = \$4,800$$

The excess withdrawal amount would then be subtracted from the value of account 130. Thus, after the withdrawal, the value of account 130 would be $48,000. Protected value 140 would similarly be reduced by the amount of the $7,000 withdrawal.

In certain embodiments, withdrawals that reduce the value of account 130 below a specified minimum amount will not be allowed if they are greater than the annual income amount. In certain embodiments, provisions in financial instrument 100 may allow for exceptions to accommodate certain provisions of the tax code. For example, if financial instrument 100 is subject to required minimum distributions under the tax code, then financial instrument 100 may provide that required withdrawals will not reduce annual income amount 142.

Each time that an additional deposit is made, the value of account 130 may be increased by the amount of the deposit. If a withdrawal has been made prior to the additional deposit, then protected value 140 may also be increased by the amount of the additional deposit and annual income amount 142 may be increased by five percent of the additional deposit. For example, suppose protected value 140 is $50,000 and annual income amount is $5,000. If customer 110 makes an additional deposit of $42,400, then protected value 140 would increase to $92,400.

$$\$50,000 + \$42,400 = \$92,400$$

Annual income amount 142 would increase to $7,120.

$$(\$42,400 \times 0.05) + \$5,000 = \$7,120$$

Again, the percentages may vary and the ability to make deposits may be controlled.

If financial instrument 100 provides for step-ups to protected value 140, during periods when step-ups are allowed customer 110 may elect to step-up protected value 140 to equal the value of account 130 (or some proportional amount). In some cases, the step-up may be automatic. If such a step-up is elected, annual income amount 142 may be set at the greater of its current value or five percent of the new protected value 140. For example, suppose the value of account 130 is $80,000, protected value 140 is $60,000 and annual income amount 142 is $3,500. If a step-up is elected, protected value 140 would be set at $80,000, and annual income amount 142 would be set at $4,000. ($80,000×0.05=$4,000).

Figure 4:
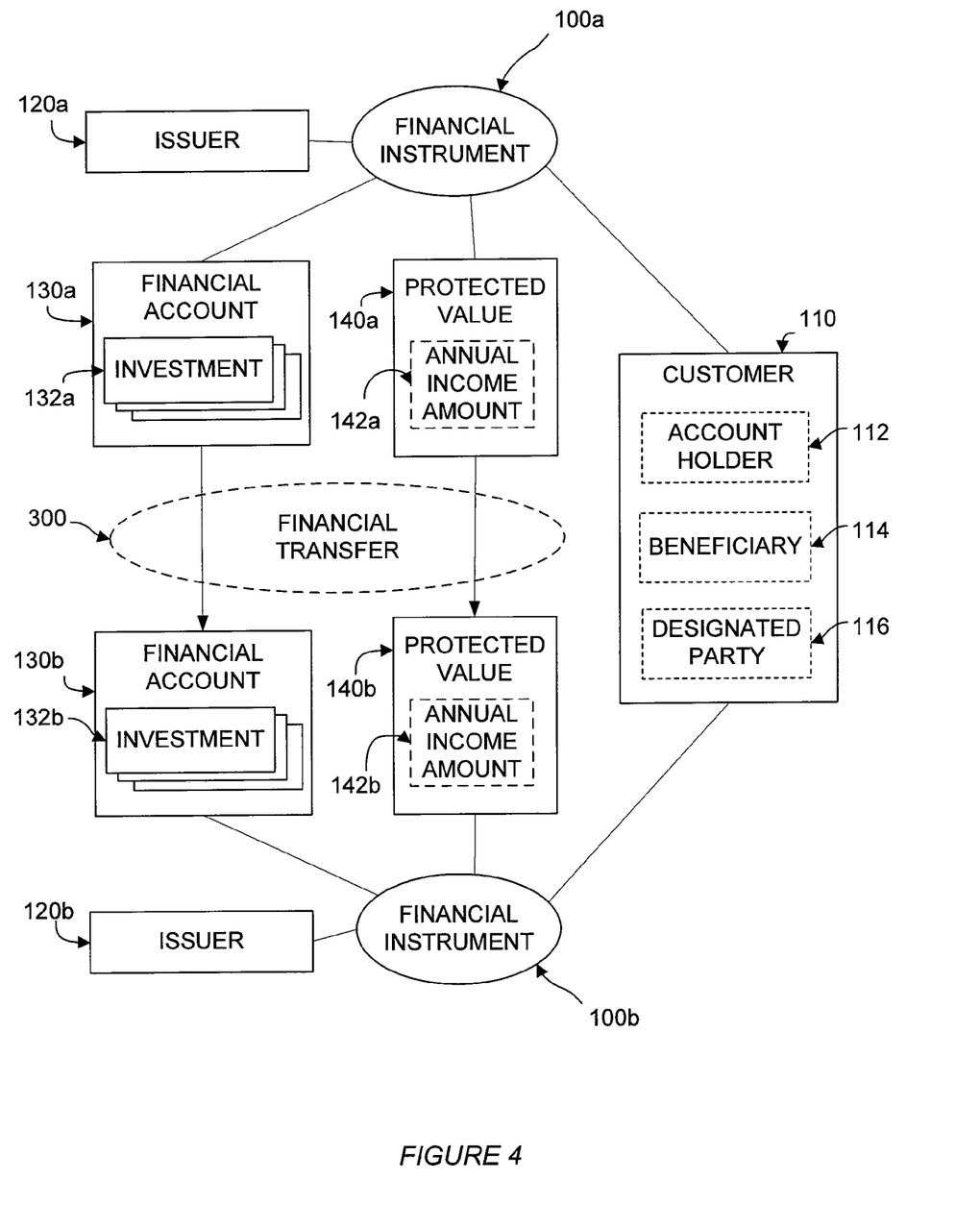
FIG. 4 illustrates an example financial transfer according to a particular embodiment.

FIG. 4 illustrates an example financial transfer 300 according to a particular embodiment. In the embodiment shown in FIG. 4, financial transfer 300 is directed from financial instrument 100a to financial instrument 100b. In the embodiment shown, both financial instrument 10a and financial instrument 100b are owned by customer 110, although in alternative embodiments, financial instrument 100b may have a different beneficiary 114 and/or designated party 116 than financial instrument 10a. In certain embodiments, financial instrument 10a may have a different account holder 112 than account 100b. For example, account holder 112 for financial instrument 10a may be both an employer and an employee and account holder 112 for financial instrument 100b may be only the employee. In certain embodiments, financial instruments 100a and 100b may be issued by the same issuer. Alternatively, financial instrument 100a may be issued by issuer 120a and financial instrument 100b may be issued by issuer 120b.

In certain embodiments, financial transfer 300 from financial instrument 10a to financial instrument 100b may include a transfer of all or a portion of account 130a to account 130b. In certain embodiments, financial transfer 300 may be associated with a rollover of a tax-deferred investment from financial instrument 10a to financial instrument 100b. In certain embodiments, in addition to the transfer of all or a portion of account 130a to account 130b, all or a portion of protected value 140a or annual income amount 142a may be transferred to protected value 140b or annual income amount 142b.

In a particular embodiment, financial instrument 100a may include portability guarantee 107 and issuer 120 may issue both financial instruments 100a and 100b to customer 110. For example, pursuant to portability guarantee 107, issuer may issue financial instrument 100b to customer 110 in response to an election by customer 110 to transfer all or a portion of account 130a. In this example, all or a portion of protected value 140a (and/or annual income amount 142a) may also be transferred. In certain embodiments, the percentage of protected value 140a (and/or annual income amount 142a) transferred may be the same as the percentage of account 130a transferred to account 130b. In alternative embodiments, the percentage of protected value 140a (and/or annual income amount 142a) transferred may be less than the percentage of account 130a transferred. In certain embodiments, the amount and/or the percentage of protected value 140a (and/or annual income amount 142a) transferred may be capped at a certain limit.

In a particular embodiment, for example, financial instrument 100a may be a traditional IRA and financial instrument 100b may be a Roth IRA. As another example, financial instrument 100a may be a group annuity or an employee retirement plan and financial instrument 100b may be an IRA. In this example, if an account holder 112 terminates employment with their employer or no longer qualifies for the group annuity, then account holder 112 may purchase (or otherwise initiate) financial instrument 100b and then transfer account 130a to account 130b. All or a portion of protected value 140a (and/or annual income amount 142a) may also be transferred to financial instrument 100b, based on the particular terms of financial instrument 100a and 100b. In these embodiments, portability guarantee 107 may provide additional value and security for customer 110 for a relatively small added cost to issuer 120. For example, portability guarantee 107 may advantageously provide customer 110 with additional flexibility with respect to employment and investment decisions.

In a particular embodiment, financial instrument 100b may include continuation guarantee 108. For example, pursuant to continuation guarantee 108, issuer may allow customer 110a to transfer all or a portion of account 130a to financial instrument 100b, and also transfer all or a portion of protected value 140a (and/or annual income amount 142a) to financial instrument 100b. As one example, customer 110 may elect to transfer all of account 130a and, pursuant to the provisions of financial instrument 100b, account 130b may be set as equal to the previous value of account 130a, protected value 140b may be set as equal to the previous value of protected value 140a, and annual income amount 142b may be set as equal to the previous value of annual income amount 142a.

In a particular embodiment, following financial transfer 300 from financial instrument 100a to financial instrument 100b, if the transfer occurs prior to a first withdrawal, then all or a portion of the account history (from the purchase of financial instrument 100a through financial transfer 300) may be maintained for use in determining protected value 140.

For example, in a particular embodiment, if account holder 112 purchases financial instrument 100a in year one with $100,000 and financial transfer 300 occurs in year six prior to a first withdrawal and all of account 130a is transferred to account 130b, then upon a first withdrawal from account 130b in year eight protected value 140b may be calculated as the greatest of the value of account 130b on the date of the withdrawal, the highest value of either account 130a or account 130b on each anniversary between year one and year eight, but in no event less than the initial deposit of $100,000 growing at a specified growth rate from year one to year eight. In certain embodiments, the anniversary date used to calculate protected value 140b may be the same as the anniversary date used to calculate 140a.

Figure 5A:
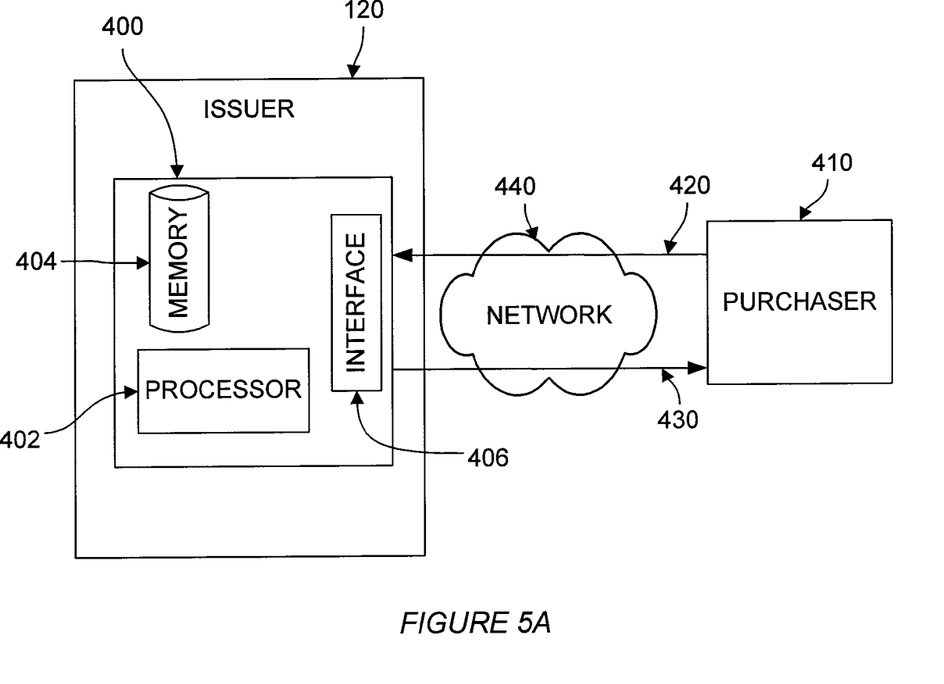
FIGS. 5A and 5B illustrate an example data processing system for providing a financial instrument according to a particular embodiment.
Figure 5B:
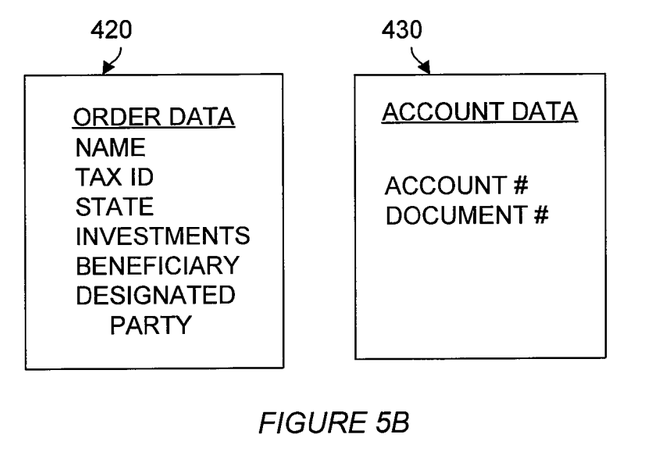

FIGS. 5A and 5B illustrate an example data processing system 400 for providing financial instrument 100 according to a particular embodiment. While in certain embodiments financial instrument 100 is entered into without using a computer, other embodiments may have a computerized option for entering into an agreement. Data processing system 400 represents hardware and controlling logic for providing financial instrument 100. In the embodiment shown, data processing system 400 may include processing module 402, memory 404, and interface 406. As shown, data processing system 400 may be included as a system controlled by issuer 120. However, in other embodiments data processing system 400 may be external to issuer 120. Additionally, although data processing system 400 is shown as a single system, data processing system 400 may be distributed across multiple platforms housed in multiple locations, some or all of which may or may not be controlled by issuer 120.

Processing module 402 may control the operation and administration of elements within data processing system 400 by processing information received from interface 406 and memory 404. Processing module 402 may include any hardware and/or controlling logic elements operable to control and process information. For example, processing module 402 may be a computer, programmable logic device, a microcontroller, and/or any other suitable device or group of devices.

Memory 404 may store, either permanently or temporarily, data and other information for processing by processing module 402 and communication using interface 406. Memory 404 may include any one or a combination of volatile or nonvolatile local or remote devices suitable for storing information. For example, memory 404 may include random access memory (RAM), read only memory (ROM), magnetic storage devices, optical storage devices, or any other suitable information storage device or combination of these devices. Memory 404 may store, among other things, order data 420 and account data 430.

Interface 406 communicates information to and receives information from devices or systems coupled to data processing system 400. For example, interface 406 may communicate with other elements controlled by issuer 120, network 440, and/or elements coupled to network 440. Thus interface 406 may include any hardware and/or controlling logic used to communicate information to and from elements coupled to data processing system 400.

Network 440 represents communication equipment, including hardware and any appropriate controlling logic, for interconnecting elements coupled to network 440. Thus network 440 may represent a local area network (LAN), a metropolitan area network (MAN), a wide area network (WAN), and/or any other appropriate form of network. Furthermore, elements within network 440 may utilize circuit-switched, packet-based communication protocols and/or other communication protocols to provide for network communications. The elements within network 440 may be connected together via a plurality of fiber-optic cables, coaxial cables, twisted-pair lines, and/or other physical media for transferring communications signals. The elements within network 440 may also be connected together through wireless transmissions, including infrared transmissions, 802.11 protocol transmissions, laser line-of-sight transmissions, or any other wireless transmission method.

In operation, order data 420 may be transmitted from purchaser 410 to data processing system 400 through network 440. Data processing system may process order data 420, generate account data 430, and transmit account data 430 to purchaser 410 through network 440. Purchaser 410 may represent one or more customers 110 or purchaser 410 may represent one or more intermediaries acting on behalf of customers 110.

Order data 420 may include the name of account holder 112, one or more tax identifiers, the resident state of account holder 112, an initial investment allocation designation, and a designation of beneficiary 114 and/or designated party 116. Account data 430 may include an account number and a document, or reference to a document, containing the provisions of financial instrument 100.

Upon receipt of order data 420, data processing system 400 may calculate any applicable fees associated with the provisions of financial instrument 100. Data processing system may also identify account 130 and identify assets and fees associated with account 130.

In certain embodiments, purchaser 410 may initiate the transmission of order data 420 through the use of a web-based application. For example, purchaser 410 may access one or more websites and may submit certain portions of order data using those websites. Similarly, purchaser 410 may utilize one or more electronic fund transfer (EFT) technologies to purchase financial instrument 100. The use of internet technologies to purchase financial instrument 100 may involve the use of one or more security provisions such as digital signatures, digital certificates, passwords, and encryptions. In certain embodiments, the collection of order data 420 may occur through the use of an interactive process. For example, a web-based application may present a series of questions to purchaser 410, which purchaser 410 may respond to and, in responding, submit the contents of order data 420.

Figure 6:
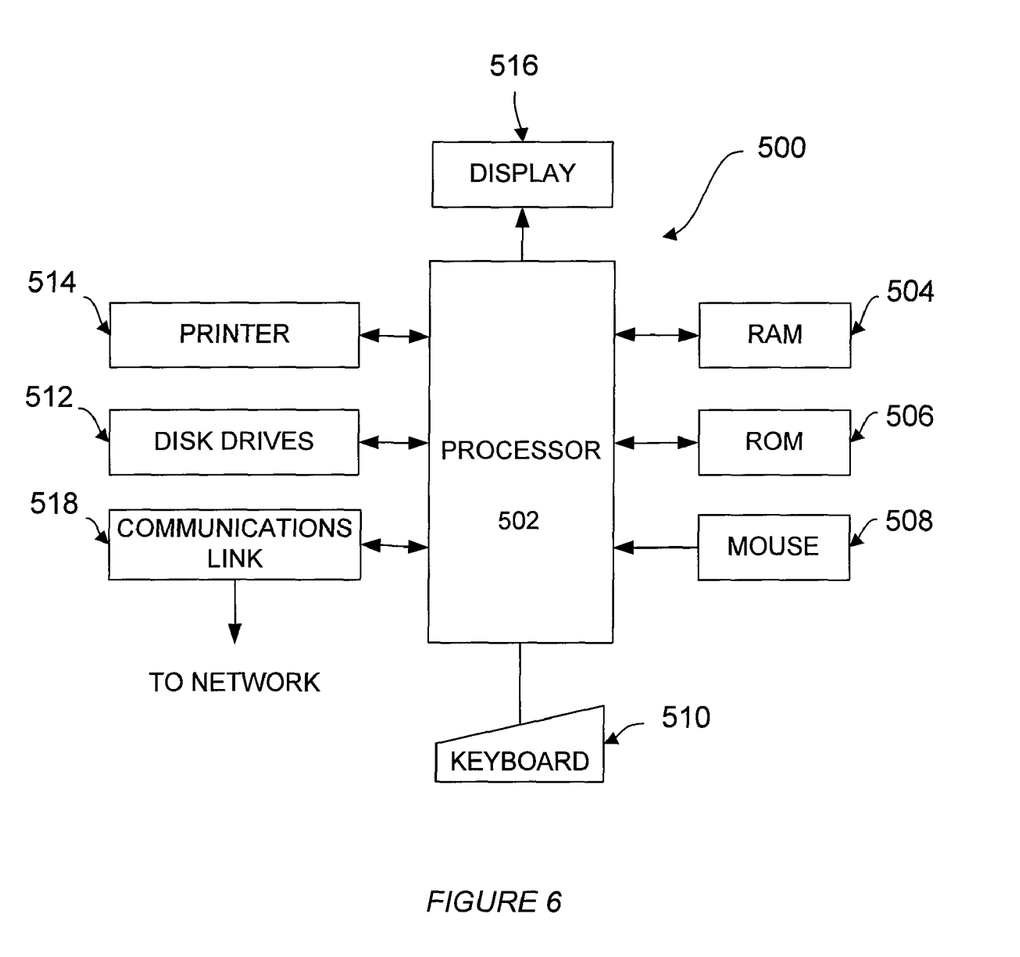
FIG. 6 illustrates an embodiment of a general purpose computer.

FIG. 6 is an embodiment of a general purpose computer 500 that may be used in connection with one or more pieces of software used to implement the invention. General purpose computer 500 may generally be adapted to execute any of the well-known OS2, UNIX, Mac-OS, Linux, and Windows Operating Systems or other operating systems. The general purpose computer 500 in this embodiment comprises a processor 502, a random access memory (RAM) 504, a read only memory (ROM) 506, a mouse 508, a keyboard 510 and input/output devices such as a printer 514, disk drives 512, a display 516 and a communications link 518. In other embodiments, the general purpose computer 500 may include more, less, or other component parts. Embodiments of the present invention may include programs that may be stored in the RAM 504, the ROM 506 or the disk drives 512 and may be executed by the processor 502. The communications link 518 may be connected to a computer network or a variety of other communicative platforms including, but not limited to, a public or private data network; a local area network (LAN); a metropolitan area network (MAN); a wide area network (WAN); a wireline or wireless network; a local, regional, or global communication network; an optical network; a satellite network; an enterprise intranet; other suitable communication links; or any combination of the preceding. Disk drives 512 may include a variety of types of storage media such as, for example, floppy disk drives, hard disk drives, CD ROM drives, DVD ROM drives, magnetic tape drives or other suitable storage media.

Although FIG. 6 provides one embodiment of a computer that may be used with the invention, the invention may additionally utilize computers other than general purpose computers as well as general purpose computers without conventional operating systems. Additionally, embodiments of the invention may also employ multiple general purpose computers 500 or other computers networked together in a computer network. Most commonly, multiple general purpose computers 500 or other computers may be networked through the Internet and/or in a client server network. Embodiments of the invention may also be used with a combination of separate computer networks each linked together by a private or a public network.

Several embodiments of the invention may include logic contained within a medium. In the embodiment of FIG. 6, the logic comprises computer software executable on the general purpose computer 500. The medium may include the RAM 504, the ROM 506 or the disk drives 512. In other embodiments, the logic may be contained within hardware configuration or a combination of software and hardware configurations. The logic may also be embedded within any other suitable medium without departing from the scope of the invention.

Although the present invention has been described in several embodiments, a plenitude of changes and modifications may be suggested to one skilled in the art, and it is intended that the present invention encompass such changes and modifications as fall within the present appended claims.

To aid the Patent Office, and any readers of any patent issued on this application in interpreting the claims appended hereto, applicants wish to note that they do not intend any of the appended claims to invoke ¶ 6 of 35 U.S.C. §112 as this paragraph and section exists on the date of filing hereof unless "means for" or "step for" are used in the particular claim.

What is claimed is:

1. A non-transitory computer-readable medium storing software, the software operable when executed by a processor to:
   store account data associated with a financial instrument issued to a customer, the financial instrument comprising an account with an account balance, wherein the account balance is based at least in part on
      an initial deposit into the account; and
      market performance of one or more variable investments;
   determine a protected value, the protected value representing a guaranteed return regardless of the market performance of the one or more variable investments and the protected value being fixed at the time of a particular event at a value at least equal to the greatest of
   the initial deposit,
   the account balance at the time of the particular event, and
   the highest value of the account balance on at least one anniversary of a customer specific date between the date of the initial deposit and the time of the particular event; and
   calculate a fee for the financial instrument;
   wherein the customer specific date is specific to the customer, determined no later than the time the financial instrument is issued to the customer, and independent of any transaction specific date related to the financial instrument, including the date of the initial deposit.

2. The software of claim 1, wherein the financial instrument further comprises a guarantee that a beneficiary may periodically receive a transfer of an amount of money for the life of a designated party, and wherein the software is further operable when executed by a processor to determine the amount as a percentage of the protected value, wherein the transfer may be due to withdrawal from the account or due to benefit payments made to the beneficiary.

3. The software of claim 1, wherein after the protected value is fixed the protected value may vary based upon withdrawals from the account in excess of a particular limit.

4. The software of claim 1, wherein the particular event is a first withdrawal from the account.

5. The software of claim 1, wherein the particular event is ten years from the date of the initial deposit.

6. The software of claim 1, wherein the particular event is an election by the customer.

7. The software of claim 1, wherein the at least one anniversary of a customer specific date is each anniversary of the customer specific date between the date of the initial deposit and the time of the particular event.

8. The software of claim 1, wherein the at least one anniversary of a customer specific date is each of the first ten anniversaries of the customer specific date between the date of the initial deposit and the time of the particular event.

9. The software of claim 1, wherein the customer specific date is a birthday of the customer.

10. The software of claim 1, wherein the customer specific date is a wedding day of the customer.

11. The software of claim 1, wherein the customer specific date is a day specified by the customer.

12. A financial instrument management system, comprising:
   a memory storing:
   account data associated with an account issued to a customer, the account having an account balance, wherein the account balance is based at least in part on an initial deposit into the account; and
market performance of one or more variable investments; and
a guarantee of a protected, value representing a guaranteed return regardless of the market performance of the one or more variable investments;
a processor in communication with the memory and operable to:
process information received from the memory;
determine and fix the protected value, the protected value being fixed at the time of a particular event at a value at least equal to the greatest of
the initial deposit,
the account balance at the time of the particular event, and
the highest value of the account balance on at least one anniversary of a customer specific date between the date of the initial deposit and the time of the particular event; and
calculate a fee for the financial instrument;
wherein the customer specific date is specific to the customer, determined no later than the time the financial instrument is issued to the customer, and independent of any transaction specific date related to the financial instrument, including the date of the initial deposit.

13. The financial instrument management system of claim 12, further comprising a guarantee that a beneficiary may periodically receive a transfer of an amount of money for the life of a designated party, wherein the amount comprises a percentage of the protected value, wherein the transfer may be due to withdrawal from the account or due to benefit payments made to the beneficiary.

14. The financial instrument management system of claim 12, wherein after the protected value is fixed the protected value may vary based upon withdrawals from the account in excess of a particular limit.

15. The financial instrument management system of claim 12, wherein the particular event is a first withdrawal from the account.

16. The financial instrument management system of claim 12, wherein the particular event is ten years from the date of the initial deposit.

17. The financial instrument management system of claim 12, wherein the particular event is an election by the customer.

18. The financial instrument management system of claim 12, wherein the at least one anniversary of a customer specific date is each anniversary of the customer specific date between the date of the initial deposit and the time of the particular event.

19. The financial instrument management system of claim 12, wherein the at least one anniversary of a customer specific date is each of the first ten anniversaries of the customer specific date between the date of the initial deposit and the time of the particular event.

20. The financial instrument management system of claim 12, wherein the customer specific date is a birthday of the customer.

21. The financial instrument management system of claim 12, wherein the customer specific date is a wedding day of the customer.

22. The financial instrument management system of claim 12, wherein the customer specific date is a day specified by the customer.

23. A non-transitory computer-readable medium storing software, the software operable when executed by a processor to:

store account data associated with a financial instrument issued to a customer, the financial instrument comprising an account with an account balance, wherein the account balance is based at least in part on
an initial deposit into the account; and
market performance of one or more variable investments;
determine a protected value, the protected value representing a guaranteed return regardless of the market performance of the one or more variable investments and the protected value being fixed at the time of a particular event;
determine an amount of money to be periodically transferred to a beneficiary for the life of a designated party, wherein the amount comprises a percentage of the protected value fixed at the time of the particular event, wherein the transfer may be due to withdrawal from the account or due to benefit payments made to the beneficiary; and
at a period of time after the time of the particular event, when the account balance is determined to be greater than the protected value on at least one anniversary of a customer specific date, increase the protected value to a value at least equal to the value of the account balance on the at least one anniversary of the customer specific date.

24. The software of claim 23, wherein after the protected value is fixed the protected value may vary based upon withdrawals from the account in excess of a particular limit.

25. The software of claim 23, wherein the particular event is a first withdrawal from the account.

26. The software of claim 23, wherein the particular event is ten years from the date of the initial deposit.

27. The software of claim 23, wherein the particular event is an election by the customer.

28. The software of claim 23, wherein the at least one anniversary of a customer specific date is each anniversary of the customer specific date between the date of the particular event and the date of the death of the designated party.

29. The software of claim 23, wherein the at least one anniversary of a customer specific date is each of the first ten anniversaries of the customer specific date after the date of the particular event.

30. The software of claim 23, wherein the increase to the protected value is performed automatically.

31. The software of claim 23, wherein the increase to the protected value is in response to an election by the customer.

32. The software of claim 23, wherein the customer specific date is a birthday of the customer.

33. The software of claim 23, wherein the customer specific date is a wedding day of the customer.

34. The software of claim 23, wherein the customer specific date is a day specified by the customer.

35. A financial instrument system, comprising:
a memory storing:
account data associated with an account issued to a customer, the account having an account balance, wherein the account balance is based at least in part on
an initial deposit into the account; and
market performance of one or more variable investments;
a protected value representing a guaranteed return regardless of the market performance of the one or more variable investments;
a processor in communication with the memory and operable to:
process information received from the memory;
at the time of a particular event, determine and fix the protected value;

determine an amount of money to be periodically transferred to a beneficiary for the life of a designated party, wherein the amount comprises a percentage of the protected value fixed at the time of the particular event, wherein the transfer may be due to withdrawal from the account or due to benefit payments made to the beneficiary; and at a period of time after the time of the particular event, when the account balance is determined to be greater than the protected value on at least one anniversary of a customer specific date, increase the protected value to a value at least equal to the value of the account balance on the at least one anniversary of the customer specific date;

wherein the customer specific date is specific to the customer, determined no later than the time the financial instrument is issued to the customer, and independent of any transaction specific date related to the financial instrument, including the date of the initial deposit.

36. The financial instrument management system of claim 35, wherein after the protected value is fixed the protected value may vary based upon withdrawals from the account in excess of a particular limit.

37. The financial instrument management system of claim 35, wherein the particular event is a first withdrawal from the account.

38. The financial instrument management system of claim 35, wherein the particular event is ten years from the date of the initial deposit.

39. The financial instrument management system of claim 35, wherein the particular event is an election by the customer.

40. The financial instrument management system of claim 35, wherein the at least one anniversary of a customer specific date is each anniversary of the customer specific date between the date of the particular event and the date of the death of the designated party.

41. The financial instrument management system of claim 35, wherein the at least one anniversary of a customer specific date is each of the first ten anniversaries of the customer specific date after the date of the particular event.

42. The financial instrument management system of claim 35, wherein the increase to the protected value is performed automatically.

43. The financial instrument management system of claim 35, wherein the increase to the protected value is in response to an election by the customer.

44. The financial instrument management system of claim 35, wherein the customer specific date is a birthday of the customer.

45. The financial instrument management system of claim 35, wherein the customer specific date is a wedding day of the customer.

46. The financial instrument management system of claim 35, wherein the customer specific date is a day specified by the customer.

* * * * *